United States Patent
Zimmerman et al.

(10) Patent No.: US 11,695,178 B2
(45) Date of Patent: Jul. 4, 2023

(54) LIQUID CRYSTAL POLYMER BATTERY ENCLOSURE MATERIAL

(71) Applicant: IONIC MATERIALS, INC., Woburn, MA (US)

(72) Inventors: Michael A. Zimmerman, North Andover, MA (US); Randy Leising, North Andover, MA (US)

(73) Assignee: IONIC MATERIALS, INC., Woburn, MA (US)

( * ) Notice: Subject to any disclaimer, the term of this patent is extended or adjusted under 35 U.S.C. 154(b) by 0 days.

(21) Appl. No.: 16/613,031

(22) PCT Filed: May 11, 2018

(86) PCT No.: PCT/US2018/032370
§ 371 (c)(1),
(2) Date: Nov. 12, 2019

(87) PCT Pub. No.: WO2018/209269
PCT Pub. Date: Nov. 15, 2018

(65) Prior Publication Data
US 2020/0168856 A1   May 28, 2020

Related U.S. Application Data

(60) Provisional application No. 62/505,389, filed on May 12, 2017.

(51) Int. Cl.
*H01M 50/105* (2021.01)
*H01M 50/102* (2021.01)
(Continued)

(52) U.S. Cl.
CPC ....... *H01M 50/131* (2021.01); *H01M 50/121* (2021.01); *H01M 50/124* (2021.01); *H01M 50/133* (2021.01); *H01M 50/178* (2021.01)

(58) Field of Classification Search
None
See application file for complete search history.

(56) References Cited

U.S. PATENT DOCUMENTS

| | | | |
|---|---|---|---|
| 2005/0197483 A1 | 9/2005 | Benicewicz et al. | |
| 2005/0233206 A1* | 10/2005 | Puttaiah | H01M 10/613 429/120 |

(Continued)

FOREIGN PATENT DOCUMENTS

| | | |
|---|---|---|
| CN | 101240106 A | 8/2008 |
| CN | 103109327 A | 5/2013 |
| CN | 105684184 A | 6/2016 |

OTHER PUBLICATIONS

Lammer et al, Holistic methodology for characterisation of the thermally induced failure of commercially available 18650 lithium ion cells, 7 RSC Advances 24425 (May 4, 2017) (Year: 2017).*

(Continued)

*Primary Examiner* — Yoshitoshi Takeuchi
(74) *Attorney, Agent, or Firm* — Burns & Levinson, LLP; Joseph M. Maraia

(57) ABSTRACT

The present invention features a pouch comprising a single layer of polymer material having a first surface and a second surface, wherein the second surface is disposed to define an interior space surrounded by the second surface of the pouch, and wherein the first surface is disposed to define the exterior of the pouch, wherein the single layer has a uniform thickness between the first surface and second surface, wherein the polymer material comprises a liquid crystal polymer, and wherein the pouch has a water vapor transmission rate of less than 0.1 g/m2/day between the interior space and the first surface of the pouch.

16 Claims, 2 Drawing Sheets

(51) Int. Cl.
*H01M 50/131* (2021.01)
*H01M 50/116* (2021.01)
*H01M 50/172* (2021.01)
*C09K 19/38* (2006.01)
*H01M 50/133* (2021.01)
*H01M 50/124* (2021.01)
*H01M 50/121* (2021.01)
*H01M 50/178* (2021.01)

(56) References Cited

U.S. PATENT DOCUMENTS

| | | | |
|---|---|---|---|
| 2008/0150064 A1* | 6/2008 | Zimmerman | H01L 23/49861 |
| | | | 257/433 |
| 2011/0155593 A1 | 6/2011 | Zhang et al. | |
| 2013/0180756 A1 | 7/2013 | Seidel | |
| 2014/0135469 A1* | 5/2014 | Kim | C09K 19/3809 |
| | | | 528/193 |
| 2015/0030824 A1 | 1/2015 | Crosley | |
| 2015/0140400 A1* | 5/2015 | Yamazaki | H01M 10/0585 |
| | | | 429/136 |
| 2016/0248054 A1 | 8/2016 | Muroi | |

OTHER PUBLICATIONS

International Search Report and Written Opinion, dated Jul. 20, 2018, from priority application PCT/US2018/032370.

* cited by examiner

LIQUID CRYSTAL POLYMER BATTERY ENCLOSURE MATERIAL

STATEMENT REGARDING FEDERALLY SPONSORED RESEARCH OR DEVELOPMENT

Not Applicable.

BACKGROUND OF THE INVENTION

Laminated enclosure or pouch materials have been used as lightweight enclosures for battery systems including, for a non-limiting example, lithium-based batteries. Laminated enclosure or pouch materials generally have several layers, including, for example, a metal layer such as an aluminum foil or film layer, and an outer sheath layer, such as a resin layer. The metal layer acts as a barrier layer for preventing the loss of electrolyte and ingress of moisture and oxygen into the enclosed battery.

The metal layer can cause problems with the enclosed batteries, however. The aluminum or other metal layer can possibly short circuit the positive and negative tabs of the enclosed battery.

In a lithium-based battery enclosed in an aluminum laminated pouch or enclosure, the aluminum can corrode with the lithium thereby forming an LiAl alloy, which can severely compromise the barrier properties of the aluminum layer. This corrosion of the aluminum layer in finished sealed lithium batteries is identified by dark spots, and results in the transfer of electrolyte out of the sealed cell, and the ingress of moisture and oxygen into the cell. This loss of barrier of the laminated pouch enclosure material results in degraded performance of the cell, typically in the form of much lower run time and poor cycle life, and can often result in the catastrophic failure of the battery.

In the manufacture of lithium-based batteries sealed with aluminum laminated enclosure or pouch materials, the formation of the dark corrosion spots typically takes several days to several weeks to manifest. Thus, manufacturers are forced to schedule a several week storage period prior to a final inspection and sorting before shipping the product batteries. Furthermore, if the corrosion reaction of aluminum with lithium is not detected or occurs after the final inspection, defective batteries are shipped to customers and can catastrophically fail in the field.

In addition, the aluminum, or other metal-based materials used as barrier layers in enclosure or pouch materials are conductive. If the sealing layer of the aluminum laminate is compromised by over-heating or over-pressure, the conductive aluminum layer can short circuit between the positive and negative tabs of the battery. In addition, by trimming the aluminum laminate, the aluminum foil is exposed at the trimmed edge. If the positive and negative tabs from the cell are not correctly aligned, they will directly short circuit by contact with the exposed aluminum foil edge.

It is also common for the laminate film to contain additional layers which are designed to protect the laminate from acidic chemicals formed in the battery electrolyte. It is well known that battery electrolyte salts, such as LiBF4 and LiPF6 can decompose and form hydrofluoric acid (HF) which can attack the laminate layers.

Thus, there is a need for improved pouch or enclosure materials for systems such as battery systems including, for a non-limiting example, lithium batteries, which require sealed enclosures for protection from electrolyte leakage and/or ingress of ambient moisture and atmosphere.

BRIEF SUMMARY OF THE INVENTION

In the present invention, selected polymer materials including liquid crystal polymers or LCPs have been found to have excellent barrier properties preventing the transfer of water and oxygen through the materials, as well as excellent chemical resistance to organic solvents and inorganic acids. The excellent barrier properties, high chemical resistance, heat seal-ability and electrical nonconductive nature of such polymer materials including LCPs provide advantages over the currently used aluminum laminate pouch or enclosure materials for the enclosure of lithium and lithium ion batteries.

The use of polymer material including LCP as the outer sheath material for a pouch or enclosure of, for example, a battery such as a lithium battery, eliminates the possibility of short circuits and corrosion with lithium. Such polymer material can provide a lightweight, single layer material which can provide an economic benefit in the manufacturing of batteries. LCP is the first polymer material with sufficient barrier properties to allow its function as an enclosure or pouch material for a lithium-based battery without the need for a metal barrier layer.

The excellent barrier properties of selected polymer materials including LCPs, along with their non-conductivity and heat seal-ability properties, provide unique opportunities for the elimination of the metal layer in the sealing sheath for lithium-based batteries. Further, LCP material is highly resistant to the attack of acidic materials, and can be used in direct contact with battery electrolytes. In addition, LCP enclosures or pouches can be laminated with other materials to incorporate additional qualities. For example, a single layer including LCP material can be laminated with other polymers and foils, such as, for a non-limiting example, metallic foils, to improve the thermal conductivity of the LCP material. The thermal conductivity of the polymer material of the enclosure or pouch containing a battery can be important for maintaining heat dissipation of the battery during charge and discharge.

A sheath material including selected polymers including LCP eliminates the possibility of the aluminum corrosion mechanism and the related lengthy storage periods, as well as the additional labor involved in the inspection and sorting of batteries which are susceptible to the corrosion mechanism. Thus, the use of LCP in sheath materials substantially removes the field failure mechanism due to, for example, the corrosion mechanism, and provide for higher reliability in use by the end-user.

Accordingly, in one aspect, the invention features a pouch comprising a single layer of polymer material having a first surface and a second surface, wherein the second surface is disposed to define an interior space surrounded by the second surface of the pouch, and wherein the first surface is disposed to define an exterior of the pouch, wherein the single layer has a uniform thickness between the first surface and second surface, wherein the polymer material comprises a liquid crystal polymer, and wherein the pouch has a water vapor transmission rate of less than 0.1 g/m2/day between the interior space and the first surface of the pouch.

In one embodiment, the thickness of the single layer is in the range of 40 to 200 microns, preferably 75-150 microns.

In one embodiment, the liquid crystal polymer G20 is thermotropic and derived from at least one monomer of a group consisting of: hydroquinone(HQ), terephthalic acid (TA), 2,6-naphthalenedicarboxylic acid (NDA), 4-hydrobenzoic acid (HBA).

In one embodiment, at least one first portion of the polymer material is thermally sealed to at least one second portion of the polymer material.

In one embodiment, at least one first portion of the second surface is thermally sealed to at least one second portion of the second surface.

In one embodiment, a battery is disposed in the interior space.

In one embodiment, the battery comprises at least one lead extending from the interior space.

In one embodiment, a first portion of the second surface of the pouch is adhered to said lead.

In one embodiment, the pouch further comprises a sealing layer, wherein the sealing layer is adhered to said lead, and wherein a first portion of the second surface of the pouch is adhered to the sealing layer.

In one embodiment, the sealing layer comprises a liquid crystal polymer.

In one embodiment, the sealing layer comprises a sealing layer polymer having a melting temperature which is lower than the melting temperature of the liquid crystal polymer of the single layer.

In one embodiment, the single layer is electrically insulative.

In one embodiment, the polymer material further comprises an inorganic filler.

In one embodiment, the filler comprises 5-10 weight percent of the polymer material. In one embodiment, the filler is platy talc.

In one embodiment, the pouch has a water vapor transmission rate of less than 0.05 g/m2/day between the interior space and the first surface of the pouch.

In one embodiment, the pouch has a water vapor transmission rate of less than 0.02 g/m2/day between the interior space and the first surface of the pouch.

In one embodiment, the polymer material comprises an inorganic filler. In another embodiment, the loading level of the inorganic filler ranges from 5-80 weight % of polymer material for adjusting the anisotropy of the fabricated article to have properties that are more isotropic in the machine or MD and transverse or TD directions, and preferably ranges from 5-15 weight %, and more preferably ranges from 5-10 weight %.

In other embodiments, the filler comprises a fused spherical silica having a mean particle size in a range of 4-28 microns; the filler comprises a boron nitride; the filler comprises a pyrophyllite; the filler comprises a talc selected from a group consisting of a talc having a non-uniform shape, a talc having a platelet form, a talc including a micronized composition, and a combination of two or more of the aforementioned talcs; and the filler comprises a mica having a crystal structure of either muscovite or phlogopite.

In one embodiment, the pouch vents when a temperature of the pouch reaches an elevated temperature range of 100-130C.

In one embodiment, the pouch is injection molded.

In one embodiment, a dielectric constant of the polymer material at 10 GHz is less than 3.5, and a dissipation factor of the polymer material at 10 GHz is less than 0.003.

BRIEF DESCRIPTION OF THE SEVERAL VIEWS OF THE DRAWINGS

Further features of the present invention will become apparent from the following description of embodiments thereof, given by way of example only, with reference to the accompanying drawings, in which.

DETAILED DESCRIPTION OF THE INVENTION

This application claims priority to U.S. Provisional Application No. 62/505,389, filed May 12, 2017. The aforementioned application is hereby incorporated by reference. This application also incorporates by reference U.S. Pat. No. 4,118,372.

Figure 1:
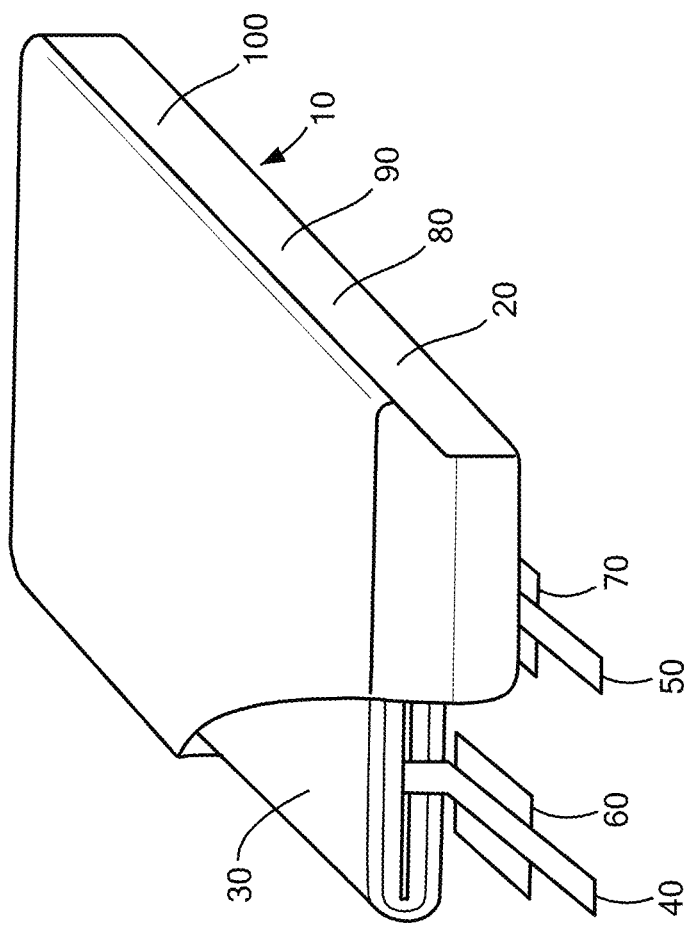
FIG. 1 is a cutout depiction of a battery enclosed in a polymer pouch according to an embodiment of the invention.

In one aspect, the pouch 10 of the invention is shown in FIG. 1 which illustrates a cutout depiction of a battery system 10. The battery system 10 includes an enclosure or pouch 20 which encloses or encapsulates a cell or battery 30. The cell or battery 30 includes at least two tabs 40 and 50 which extend from the electrodes of the cell or battery 30 for electrical communication with an external load (not shown). The tabs 40 and 50 can be planar shaped, and are electrically conductive. The tabs 40 and 50 can include a conductive metal such as copper or aluminum.

The enclosure or pouch 20 includes a single layer 80 of polymer material 90. In different embodiments, the enclosure or pouch 20 can be created from one or more strips (not shown) of polymer material. The enclosure or pouch 20 can be formed by thermoforming polymer strips or sheets into a contiguous enclosure or pouch. In one embodiment, the enclosure can be formed from two opposing planar strips of polymer material. Each opposing planar strip or polymer material can have a first surface and a second surface, with each second surface facing towards the second surface of the opposing planar strip, and each first surface facing away from the first surface of the opposing planar strip. During thermoforming, a circumferential seal can be created by adhering together a portion of each second surface of the opposing planar strips. During the adhering process, the portions of the second surface of each opposing planar strip which are adhered together can be thermally joined to one another, thereby causing each portion of each second surface to melt and then re-solidify together.

In a preferred embodiment, the polymer material 90 includes a liquid crystal polymer 100 or LCP. In another preferred embodiment, the polymer material 90 is formed into a single layer 80 of liquid crystal polymer material 100. Preferably, the single layer 80 has a planar thickness of between 40 to 200 microns, and more preferably between 75 and 150 microns.

In an alternative embodiment, the enclosure or pouch 20 can be formed by a conventional injection molding process. Such an injection molding process does not require sealing of a periphery and thus can avoid the above described sealing steps. An enclosure or pouch 20 made by injection molding can be formed with an opening in which a battery or other article can be inserted or passed through into an interior of the enclosure or pouch. The opening created for passage of the enclosed battery or article of the injection molded enclosure or pouch 20 can then be sealed similarly to pouches made via different methods as described below.

In the present application, the term "single layer" refers to a single layer of polymer material in contrast to the prior art laminate pouch materials including, for example, a metal barrier layer, such as an aluminum film or foil, and an outer sheath layer, such as a resin layer, as described above in the background description of prior art. In different embodiments, the enclosure or pouch 20 is laminated or can include a laminated portion for sealing the enclosure, or for joining strips of polymer material to form the enclosure, or for including additional materials such as, for non-limiting examples, additional polymer materials or metallic materials for enhancing selected properties of the enclosure or pouch 20. Nonetheless, the enclosure or pouch 20 predominately or substantially depends upon or is related to the properties of the single layer or portion of the single layer 80 of the polymer material 90 which includes a substantial portion of the surface area of the enclosure of pouch 20.

FIG. 1 shows that the enclosure of pouch 20 encapsulates the battery or cell 30. The single layer 80 of the polymer material 90 is thermally sealed with at least one thermoforming step for sealing the battery or cell 30 with a hermetic seal while permitting the protrusion of the tabs 40 and 50. In one embodiment, this seal can include a seam (not shown) including a portion of strips of polymer material to be joined thermally. The seal and associated sealing step must accommodate the protruding tabs and provide a seal around the tabs 40 and 50.

In commercial battery pouch cells, this sealing or closing is achieved by pre-welding a small amount of hot melt adhesive to the metal current collector tabs. This hot melt adhesive then creates an air-tight seal with the aluminum laminate pouch during heat sealing. This is necessary because it is not possible to bond the metal current collector tabs directly to aluminum laminate.

In one embodiment, the LCP 100 of the polymer material 90 of single layer 80 of the enclosure or pouch 20 can have a LCP-metal bonding temperature similar to the temperature required to bond or seal the LCP to LCP.

During sealing, metal can act as a heat sink and remove heat from the interface for sealing the enclosure or pouch to the metal tabs 40 and 50. This heat sink effect can reduce the temperature at the sealing interface, and can lead to reduced seal quality. For example, where the heat seal is made at the edge of the current collector, heat can only be conducted away through one side of the heat seal. Consequently, this heat seal may provide good adhesion on the side where heat cannot be removed, but little or no adhesion near the edge where heat can be conducted away.

In one embodiment, the present invention solves this issue with an enclosure or pouch cell manufactured with an oversized heat seal band, which is sufficiently wide to prevent heat conduction in one direction. This creates good adhesion between the LCP and the current collector tabs on one side of the seal. Thus, if the width of the seam is sufficiently large, it is possible to have a wide enough region of good bonding to make an airtight seal.

In one embodiment, the enclosure or pouch is sealed closed using a process similar to the processes used with prior art enclosure or pouch materials. The commercial current collector tabs contain a strip of hot melt adhesive that is pre-bonded to the metal current collector. The hot melt adhesive enables the tab to be sealed in an airtight fashion to the conventional aluminum laminate pouch material. In the present invention, the LCP can adhere to metal during heat sealing by pre-sealing a layer of LCP to the current collector tab. The pre-sealed layer of LCP serves the same function as the hot melt adhesive in the conventional battery pouch tabs. FIG. 1 shows such pre-sealed layers 60 and 70. The pre-sealed layers 60 and 70 can be sealed to the corresponding tab on both sides, forming to the tab continuously. The pre-sealed layers 60 and 70 can then be bonded to the enclosure or pouch 20 during the sealing process step. In one embodiment, the LCP chosen for the pre-sealed layers 60 and 70 has a similar melting point as the LCP selected for the polymer material 90 of the single layer 80 of the enclosure or pouch 20 to ensure a good seal.

The enclosure or pouch 20 can consist essentially of or can include LCPs or liquid crystalline polymers which can also include fillers and/or impact modifiers which are further described. The LCP or liquid crystalline polymer provides the enclosure or pouch 20 its functionality which can be enhanced by such fillers and impact modifiers.

The liquid crystalline polymers (LCPs) used in the embodiments of the invention are preferably thermoplastic polyester polymers containing rigid mesogenic linkages. These polymers generally have crystalline melting points in the range of from about 250° C. to 375° C., more preferably from about 270° C. to 355° C. Suitable polymers which can be used as polymer components in the production of films include polyesters comprising monomer units derived from 4-hydroxybenzoic acid and 6-hydroxy-2-naphthoic acid; a polyester comprising monomer units derived from 6-hydroxy-2-naphthoic acid, terephthalic acid; and a polyester comprising monomer units derived from 4-hydroxybenzoic acid, terephthalic acid and 4, 4'-bisphenol.

In the present application, the terms "liquid crystalline polymer(s), liquid crystal polymer(s) or LCP(S)" refer to polymer(s) that is/are anisotropic when tested using the thermos-optical test or TOT test or any reasonable variation thereof, as described in U.S. Pat. No. 4,118,372.

The LCPs are typically derived from monomers that include aromatic hydroxycarboxylic acids, aromatic dicarboxylic acids, aliphatic dicarboxylic acids, aromatic diols, aliphatic diols, aromatic hydroxyamines, and aromatic diamines. For example, they may be aromatic polyesters that are obtained by polymerizing one or two or more aromatic hydroxycarboxylic acids; aromatic polyesters obtained by polymerizing aromatic dicarboxylic acids, one or two or more aliphatic dicarboxylic acids, aromatic dials, and one or two or more aliphatic dials, or aromatic hydroxycarboxylic acids; aromatic polyesters obtained by polymerizing one or two or more monomers selected from a group including aromatic dicarboxylic acids, aliphatic dicarboxylic acids, aromatic diols, and aliphatic dials, aromatic polyester amides obtained by polymerizing aromatic hydroxyamines, one or two or more aromatic diamines, and one or two or more aromatic hydroxycarboxylic acids; aromatic polyester amides obtained by polymerizing aromatic hydroxyamines, one or two or more aromatic diamines, one or two or more aromatic hydroxycarboxylic acids, aromatic dicarboxylic acids, and one or two or more aliphatic carboxylic acids; and aromatic polyester amides obtained by polymerizing aromatic hydroxyamines, one or two or more aromatic diamines, one or two or more aromatic hydroxycarboxylic acids, aromatic dicarboxylic acids, one or two or more aliphatic carboxylic acids, aromatic diols, and one or two or more aliphatic diols.

Examples of aromatic hydroxycarboxylic acids include 4-hydroxybenzoic acid, 3-hydroxybenzoic acid, 2-hydroxybenzoic acid, 6-hydroxy-2-naphthoic acid, and halogen-, alkyl-, or allyl-substituted derivatives of hydroxybenzoic acid.

Examples of aromatic dicarboxylic acids include terephthalic acid; isophthalic acid; 3,3'-diphenyl dicarboxylic acid; 4,4'-diphenyl dicarboxylic acid; 1,4-naphthalene dicarboxylic acid; 1,5-naphthalene dicarboxylic acid; 2,6-naphthalene dicarboxylic acid; and alkyl- or halogen-substituted aromatic dicarboxylic acids, such as t-butylterephthalic acid, chloroterephthalic acid, etc.

Examples of aliphatic dicarboxylic acids include cyclic aliphatic dicarboxylic acids; such as trans-1,4-cyclohexane dicarboxylic acid; cis-1,4-cyclohexane dicarboxylic acid; 1,3-cyclohexane dicarboxylic acid; and substituted derivatives thereof.

Examples of aromatic diols include hydroquinone; bisphenol; 4,4'-dihydroxydiphenyl ether; 3,4'-dihydroxydiphenyl ether; bisphenol A; 3,4'-dihydroxydiphenylmethane; 3,3'-dihydroxydiphenylmmethane; 4,4'-dihydroxydiphenylsulfone; 3,4'-dihydroxydiphenylsulfone; 4,4'-dihydroxydiphenylsulfide; 3,4'-dihydroxdiphenylsulfide; 2,6'-naphthalenediol; 1,6'-naphthalenediol; 4,4'-dihydroxybenzophenone; 3,4'-dihydroxybenzophenone; 3,3'-dihydroxybenzophenone; 4,4'-dihydroxydiphenyldimethylsilane; and alkyl- and halogen-substituted derivatives thereof.

Examples of aliphatic dials include cyclic, linear, and branched aliphatic diols, such as trans-1,4-hexanediol; cis-1,4-hexanediol; trans-1,3-cyclohexanediol; cis-1,2-cyclohexanediol; ethylene glycol; 1,4-butanediol; 1,6-hexanediol; 1,8-octanediol; trans-1,4-cyclohexanedimethanol; cis-1,4-cyclohexanedimethanol; etc., and substituted derivatives thereof. Examples of aromatic hydroxyamines and aromatic diamines include 4-aminophenol, 3-aminophenol, p-phenylenediamine, m-phenylenediamine, and substituted derivatives thereof.

The LCPs can be produced using any method known in the art. For example, they can be produced by standard polycondensation techniques (melt polymerization, solution polymerization, and solid-phase polymerization). Preferably, the LCPs can be produced in an inert gas atmosphere under anhydrous conditions. For example, in the melt acidolysis method, the necessary quantities of acetic anhydride, 4-hydroxybenzoic acid, diol, and terephthalic acid are stirred, after which they are heated in a reaction vessel provided with a combination of a nitrogen introduction tube and a distillation head or cooler; the side reaction products, such as acetic acid, are removed through the distillation head or cooler, after which they are collected. After the quantity of collected side is reaction products becomes constant, and the polymerization is almost completed, the melted lump is heated under a vacuum (ordinarily, 10 mmHg or lower) and the remaining side reaction products are removed, completing the polymerization.

The LCPs typically have number average molecular weights in the range of about 2,000 to about 200,000, or more preferably about 5,000 to about 50,000, or yet more preferably about 10,000 to about 20,000.

Polyesters that contain repeat units derived from hydroquinone; terephthalic acid; 2,6-naphthalene dicarboxylic acid; and 4-hydroxybenzoic acid in these liquid crystal polymers are ideal for use in this invention. In particular, they are liquid crystal polyesters comprising the following repeat units:

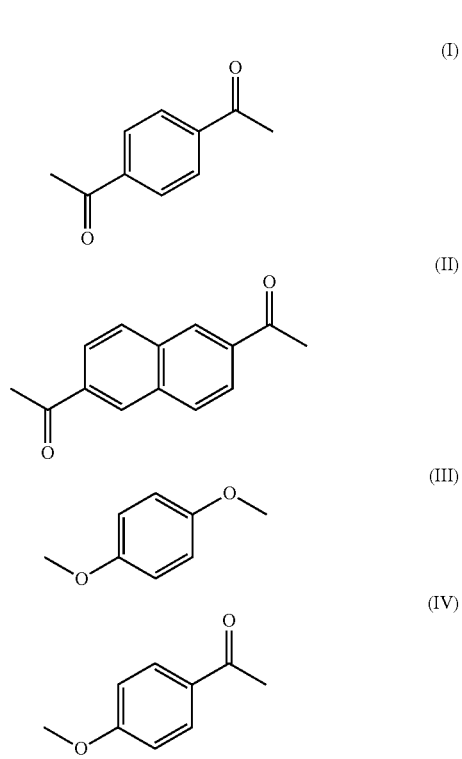

wherein diacid residues consisting essentially of: about 3.8 to 20 mole percent terephthalic acid (I) residues, and about 15 to 31 mole percent 2,6-naphthalenedicarboxylic acid(II); diol residues consisting essentially of: about 25 to 40 mole percent hydroquinone (III) residues; and about 20 to 51 mole percent p-hydroxybenzoic acid (IV) residues, wherein the (I):(II) molar ratio is from about 15:85 and 50:50, the moles of (III) are equal to the sum of the moles of (I)+(II), and the total of the residues' mole percentages is equal to 100.

In one embodiment, polyesters and polyester-amides are those available from Hoechst Celanese Corporation under the trademark VECTRA●. These include VECTRA●A polyester (such as Vectra A950), VECTRA●C polyester, VECTRA●E polyester, VECTRA V (such as V400P), and VECTRA●B polyester-amide; and ZENITE, including ZENITE 5000. The specific base resin for the LCP is chosen for its mechanical functionality appropriate for the desired usage.

In one embodiment, the LCP is compounded with fillers and blend resins to form desirable mechanical functionality in the polymer enclosure. Fillers are known to introduce isotropic properties in LCP composites, and this are useful in this aspect in the range of about 5-40 wt. %. Platy talcs such as JA-24RC from Asada Chemical, Artic Mist and JetFil 575P from Imerys provide desired mechanical properties in the polymer enclosure. Blend resins such as Fusabond M603 (DuPont) and Adflex KS 021P (Lyondelle Bassell) are also useful to add desired mechanical properties such as added ductility, however their use can compromise other functionality such as moisture uptake.

In one embodiment, the polymer material can include other inorganic fillers in order to adjust the anisotropy of the fabricated article to have properties that are more isotropic in the machine or MD and transverse or TD directions. The filler loading levels can range from 5-80 weight percent. In addition to talcs, other fillers such as fused spherical silica, where mean particle sizes are in the range of 4-28 microns; boron nitride; pyrophyllite; talc which is not a uniform shape, which can come in the form of platelets and micronized compositions; mica, particularly wherein the crystal structure of the mica is either muscovite or phlogopite.

In one embodiment, the properties of the inorganic filler can be important to accomplish the desired properties in the filled LCP. Such properties and associated preferred range are as follows: MOHs hardness<4.0, maximum use temperature>300 C, CTE<12 ppm/C, Dielectric constant<9.0, loss tangent<0.005.

The compounded LCP resin is then extruded into sheets with the desired thickness. Inone embodiment, the resin is melt extruded through a die to the desire thickness and can then be further processed for thickness modification and uniformity adjustment.

The performance of the polymer enclosure can be measured by its water vapor transmission rate or (WVTR) which is also sometimes referred to as moisture vapor transmission rate (MVTR). There are many ways of determining the WVTR, but for purposes of this specification and its claims the WVTR shall be determined according to the ASTM F1249 method.

Although the use of an enclosure or pouch including a polymer material has been described herein as an enclosure or pouch material for enclosing a battery, the enclosure or polymer material of the present invention is not limited to battery applications and its functionality can provide several advantages in other packaging materials.

EXAMPLES

Example 1

Polymer enclosure strips of various thicknesses were prepared for purposes of the following examples according to the following described methods.

A compounded resin was prepared with the components listed in Table 1:

TABLE 1

| Component | Weight % |
| --- | --- |
| Vectra A950 | 90 wt. % |
| Imerys Artic Mist Platy Talc | 10 wt. % |

The components were mixed, and then extruded to various film thicknesses. Pouches were made by heat sealing the manufactured films to render hermetic enclosures. The resulting films were tested according to the following tests and found to have the associated measured characteristics:

TABLE 2

| Property | Value | Unit | Test Standard |
| --- | --- | --- | --- |
| Moisture Absorption | <0.04 Avg. | % | IPC-TM-650.2.6.2.1 |
| Flammability | V-0 | Rating | UL-94 |
| Tensile Strength @ 5mm/min (X-Y) | 150-50 | MPa | ISO 527-1/-2 |
| Elastic Modulus @ 5mm/min (X-Y) | 4.4 | GPa | ISO 527-1/-2 |
| Tensile Elongation @ 5mm/min (X-Y) | 7-19 | % | ISO 527-1/-2 |
| Melt Temperature (20 C./min) | 290 | ° C. | ISO 11357-1/-2/-3 |

TABLE 2-continued

| Property | Value | Unit | Test Standard |
| --- | --- | --- | --- |
| Coefficient of Thermal Expansion (Z) | <100 | ppm/° C. | Volume Expansion Calculation |
| Dissipation Factor @ 10 GHz | <3.5 | | IPC-TM-650.2.5.5.9 |
| Dielectric Constant @ 10 GHz | <0.003 | | IPC-TM-650.2.5.5.9 |

The low Dielectric constant and dissipation factor display that the polymer material does not provide significant interference in electrical applications like a cell phone, and thus has an additional advantage relative to conventional metallic pouch materials.

Example 2

Figure 2:
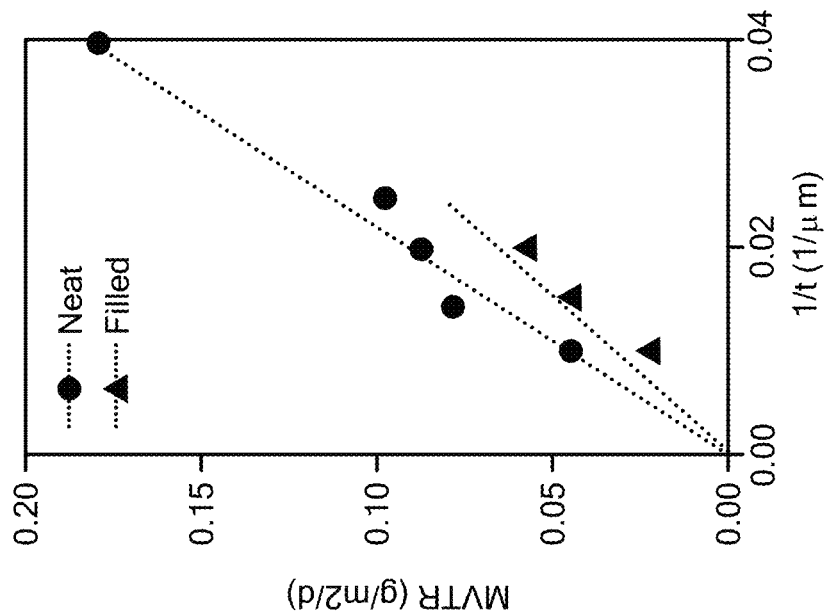
FIG. 2 is a graph showing moisture vapor transmission rates at room temperature through neat and platy talc filled LCP enclosures according to embodiments of the invention.

A Mocon (Minneapolis, Minn.) system was used to measure water (or moisture) vapor transmission rates (WVTR or MVTR respectively) at room temperature through the polymer enclosure. The system was used to perform measurements on neat and filled LCP films. The neat resin films did not include the platy talc filler described above. The results are summarized in FIG. 2. Observations include: MVTR values for LCP in the thickness range of interest to battery pouches, that is, 25-100 microns, at room temperature are between 0.01 and 0.1 g/m2/d; and the addition of fillers appears to reduce MVTR, and the fillers may provide a more tortuous path for transmission.

Example 3

The Mocon (Minneapolis, Minn.) system (Mocon Aquatran 1) was again used to measure water (or moisture) vapor transmission rates at room temperature through polymer enclosures of various thicknesses. The system was used to perform measurements on both the filled single layer LCP films of Example 1, and commercially available laminated battery pouch materials. The measurements were conducted at 30C and at 100% relative humidity, and the results are listed in Table 3:

TABLE 3

| Material | WVTR (g/m$^2$/day) |
| --- | --- |
| Example 1: 75 microns | 0.0418 |
| Example 1: 100 microns | 0.0320 |
| Example 1: 150 microns | 0.0184 |
| Example 1: 200 microns | 0.0084 |
| Comparative Aluminum laminate - 200 microns | 0.0202 |

These results show that the transmission rates of the polymer enclosure are comparable to commercially available laminate materials.

Example 4

It is important for battery enclosure materials to prevent the leakage of battery electrolytes from the cell to maintain good performance of the cell and to prevent the contamination of the surrounding environment with battery electrolyte.

To demonstrate the suitability of the polymer enclosure material in the presence of a battery electrolyte, the polymer enclosure material was heat sealed with a mixture of organic solvents (ethylene carbonate (EC), ethyl methyl carbonate (EMC), dimethyl carbonate (DMC) and vinylene carbonate (VC)) and lithium hexafluorophosphate (LiPF6) dissolved salt, which is used as a lithium ion battery electrolyte included in the sealed enclosure. This mixture of solvents was chosen because it contains several different carbonate-based solvents used in lithium ion batteries, with some of these solvents, such as DMC, having a low boiling point and thus a high vapor pressure at room temperature. In addition, LiPF6 is a common salt used in lithium ion electrolytes. This salt is known to decompose in the presence of heat or moisture to give corrosive hydrofluoric acid (HF), and thus is also a good test of barrier properties of the pouch material in the presence of acidic impurities. The LCP pouches were approximately 6 cm in width and 10 cm in length, and contained 1 to 3 g of electrolyte. The pouches were sealed on all four sides, with a perimeter seal length of approximately 32 cm. As a control, aluminum laminate pouch material specifically designed and commercially sold for use in lithium ion batteries was also used in the experiment with the same electrolyte mixture and the same overall dimensions as described for the LCP pouches. All of the sealed pouches containing electrolyte were stored at room temperature and the weight of the pouches was periodically measured to determine the amount of material (if any) lost. Both the barrier properties of the film as well as the heat-sealed portions of the pouches were thus examined.

Figure 3:
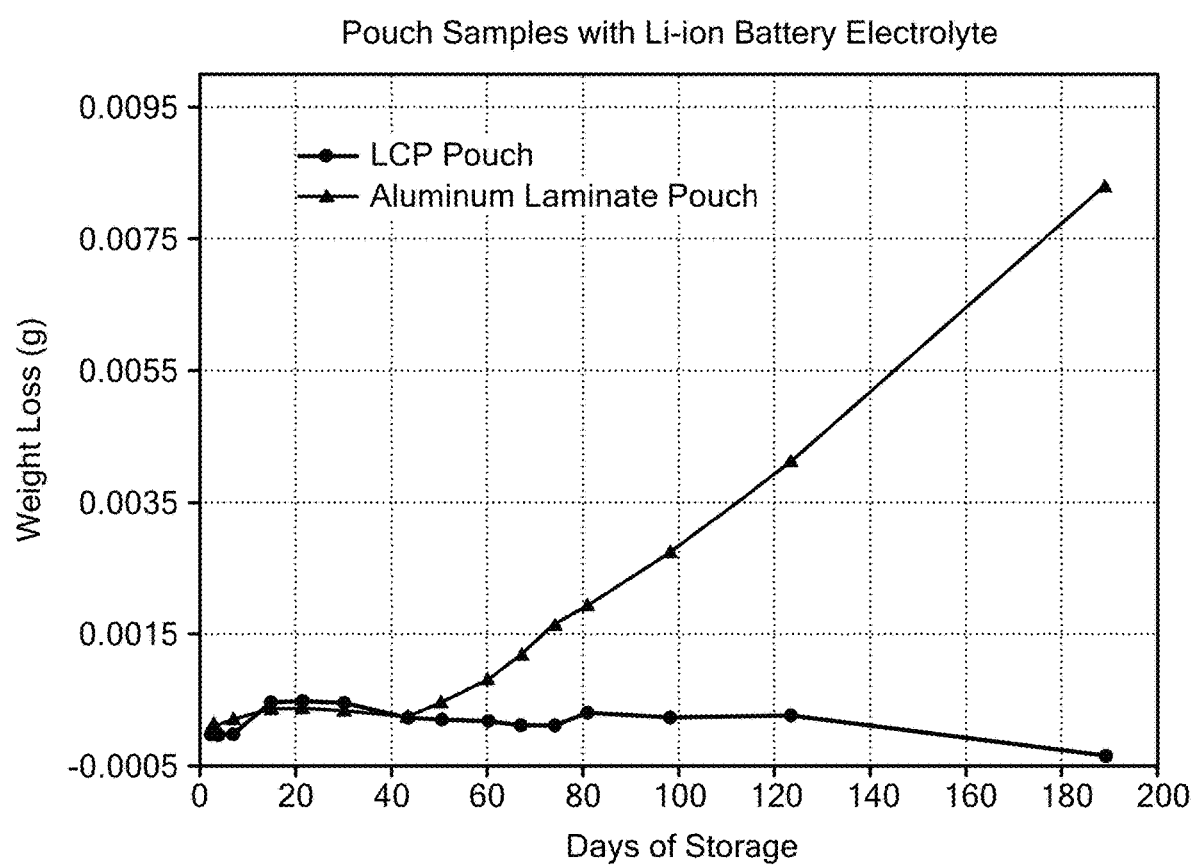
FIG. 3 is a graph showing barrier properties in terms of weight loss for a polymer enclosure according to an embodiment of the invention in comparison with a commercially available aluminum laminate pouch material.

The results of this test are presented in the graph in FIG. 3. As can be seen from this data, the polymer enclosure provided excellent barrier properties, with virtually no weight loss for over 6 months of storage time at room temperature. In contrast, the aluminum laminate pouches in this study displayed significant weight loss over the same duration of storage time.

Example 5

To test different solvents from those used in Example 4, LCP and aluminum laminate pouches were constructed as described above, but in this case using propylene carbonate (PC) and 1,2-dimethoxyethane (DME) solvents only. This organic solvent mixture was chosen since it is a common electrolyte solvent mixture used in primary lithium batteries, and it contains an ether based solvent in addition to the carbonate solvent. The DME component is also a low boiling solvent that poses a particular challenge to a barrier material. The LCP and aluminum laminate pouches in this experiment were both tested at room temperature and elevated temperature (55° C.).

The results of the experiment are presented in TABLE 4. Similar to the results found in Example 4, the LCP pouches provided superior barrier performance, where essentially zero weight loss was found for the pouches after several months of storage. As before, the aluminum laminate pouch displayed significantly more weight loss over the same time period of the experiment. It should be noted that the LCP pouch material used in this test was 20% thinner than the aluminum laminate material.

TABLE 4

Weight Loss After 128 Days of Storage

|  | LCP Pouch | Al Laminate Pouch |
| --- | --- | --- |
| Thickness | 91 microns | 114 microns |
| Wt. Loss at RT | −0.0002 g | 0.0706 g |
| Wt. Loss at 55° C. | 0.0001 g | 0.2199 g |

Example 6

In addition to the electrolyte barrier properties demonstrated in Examples 4 and 5, it is important for a battery pouch material to prevent moisture from entering the cell. Lithium and lithium-ion batteries are severely impacted in a negative way by moisture that enters into a cell over time.

To test the moisture barrier property of the LCP pouch material, pouches were heat sealed with lithium ion battery electrolyte as described in Example 4. Once again, aluminum laminate pouches were used as a control. The LCP pouch material was 100 microns in thickness and the aluminum laminate pouch material was 114 microns in thickness. All of the pouches were sealed inside a dry glovebox, containing an argon gas atmosphere. The dimensions of the pouches were 6 cm×10 cm, as used in previous experiments. After heat sealing the pouches, they were removed from the dry atmosphere and placed in high humidity (93% Relative Humidity) storage at room temperature for two weeks. After the storage period, the pouches were taken back into the glovebox and the electrolyte materials taken out of the pouches. The electrolyte samples were then tested for $H_2O$ content by Karl Fisher titration, and for hydrofluoric acid (HF) by sodium hydroxide titration. The results of these tests are presented below in TABLE 5. As can be seen from this table, the amount of water and HF found in the electrolyte sample were identical for the LCP pouch and aluminum laminate pouch material. Thus, this demonstrates the utility of LCP pouch material as a moisture barrier, since aluminum laminate pouch materials have been shown in practice to be sufficient as a moisture barrier for lithium and lithium ion batteries.

TABLE 5

Moisture Barrier Test

|  | LCP Pouch | Al Laminate Pouch |
| --- | --- | --- |
| Thickness | 100 microns | 114 microns |
| $H_2O$ Concentration | 5 ppm | 5 ppm |
| HF Concentration | 570 ppm | 568 ppm |

Example 7: Moisture Absorption

The aluminum laminate pouch material of the prior art will adsorb some moisture and must be dried before using this material in a dry cell manufacturing area. The LCP pouch material does not adsorb moisture, which provides a benefit for the manufacturing of lithium and lithium ion batteries, where moisture needs to be excluded from the final sealing process.

In TABLE 6 below, small test coupons (2.8 $cm^2$ in area) from Example 1 were vacuum dried and then subjected to 93% relative humidity for >48 h. The test coupons were weighed before and after the humidity test and the results show that the aluminum laminate material adsorbs moisture, while the LCP materials did not.

TABLE 6

| Material | Sample | Weight after Vacuum Dry | Weight after humidity exposure | % Moisture |
| --- | --- | --- | --- | --- |
| Aluminum Laminate | 1 | 0.0517 | 0.0521 | 1% |
| LCP 1 | 1 | 0.0422 | 0.0422 | 0% |
| LCP 2 | 1 | 0.0421 | 0.0421 | 0% |

Example 8

Battery pouches were made according to Example 1, and used to package Lithium Ion cells. For comparison a commercially purchased aluminum laminated pouch containing a Lithium Ion cell was used in a similar assembly.

Each pouch was heated between two spring-loaded steel plated, and the battery temperature was monitored. During heating an expected exotherm occurs at around 225C, when the battery can experience a thermal runaway initiated when the battery becomes self-heating. The reasons for this can be multiple and vary depending on the composition and design of the cell. However, the self-heating can continue until the cell disassembles. In rigid metallic enclosed cells, pressure relief systems and fusing can be incorporated to reduce this risk, but in aluminum laminated pouch cells this runaway remains a safety risk. Referring to Table 7, there are results of this testing.

TABLE 7

| Cell Enclosure | Cell Vent T (C) | Exotherm Onset (C) | Peak Temp (C) | External Observations | EUCAR scale severity |
|---|---|---|---|---|---|
| Al Laminate | 137 | 220 | 665 | Smoke | 4 |
| LCP Pouch | 105 | 225 | 260 | Nothing | 3 |

Observation of this test include: the LCP pouch ruptured at lower temperatures than the aluminum laminate controls; there was less stored energy in the LCP pouch cells at rupture thus a less energetic rupture event; continued heating leads to the expected exotherm at about 225C, but for the LCP pouch the exotherm is much less severe and the peak temperature is less than the melting temperature of the polymer pouch material. As the LCP pouch battery did not vent (because of pressure) or otherwise disassemble, its corresponding EUCAR scale is lower and judged safer.

The LCP pouch enclosure thus provides engineered venting at the lower temperature, and this venting is much greater than the operating temperature range of 20-60C, this attribute is an inherent feature of the LCP. The range of venting with elevated temperature is from 100-130C for the composition described in Example 1, and such range may be altered by modification of the composition.

The foregoing examples and description are not to be deemed limiting of the invention which is defined in the following claims. The invention is understood to encompass such obvious modifications thereof as would be apparent to those of ordinary skill in the art.

What is claimed is:

1. An apparatus comprising:
   a single layer of polymer material having a first surface and a second surface;
   wherein the second surface is disposed to define an interior space of a pouch surrounded by the second surface of the pouch;
   wherein the first surface is disposed to define an exterior of the pouch;
   wherein the single layer has a uniform thickness between the first surface and second surface;
   wherein the polymer material comprises a liquid crystal polymer; and
   wherein the pouch has a water vapor transmission rate of less than 0.1 g/m2/day between the interior space and the first surface of the pouch;
   a battery disposed in the interior space, wherein the battery comprises at least one lead in the form of one or more current collector tabs, and wherein said lead extends from the interior space; and
   a pre-sealed sealing layer adhered to said lead, and wherein a first portion of the second surface of the pouch is adhered to said sealing layer by way of an oversized heat seal band, wherein the oversized heat seal band prevents heat conduction in one direction by fostering adhesion between the polymer material and the one or more collector tabs on one side of the sealing layer to create an airtight seal.

2. The apparatus of claim 1, wherein the thickness of the single layer is in a range of 40 to 200 microns.

3. The apparatus of claim 1, where the liquid crystal polymer is thermotropic and derived from at least one monomer of a group consisting of: hydroquinone(HQ), terephthalic acid(TA), 2,6-naphthalenedicarboxylic acid (NDA), 4-hydrobenzoic acid (HBA).

4. The apparatus of claim 1, where at least one first portion of the polymer material is thermally sealed to at least one second portion of the polymer material.

5. The apparatus of claim 4, wherein at least one first portion of the second surface is thermally sealed to at least one second portion of the second surface.

6. The apparatus of claim 1, wherein the single layer is electrically insulative.

7. The apparatus of claim 1, wherein the polymer material comprises an inorganic filler.

8. The apparatus of claim 7, wherein the inorganic filler comprises 5-10 weight percent of the polymer material.

9. The apparatus of claim 7, wherein the inorganic filler is platy talc.

10. The apparatus of claim 1, wherein the pouch has a water vapor transmission rate of less than 0.05 g/m2/day between the interior space and the first surface of the pouch.

11. The apparatus of claim 1, wherein the pouch has a water vapor transmission rate of less than 0.02 g/m2/day between the interior space and the first surface of the pouch.

12. The apparatus of claim 1, wherein the pouch vents when a temperature of the pouch reaches a temperature range of 100-130C.

13. The apparatus of claim 1, wherein the pouch is injection molded.

14. The apparatus of claim 1, wherein a dielectric constant of the polymer material at 10 GHz is less than 3.5, and wherein a dissipation factor of the polymer material at 10 GHz is less than 0.003.

15. The apparatus of claim 1, wherein the sealing layer comprises a liquid crystal sealing layer polymer.

16. The apparatus of claim 1, wherein the sealing layer comprises a sealing layer polymer, and wherein the sealing layer polymer has a melting temperature which is lower than a melting temperature of the liquid crystal polymer of the single layer.

* * * * *

UNITED STATES PATENT AND TRADEMARK OFFICE
CERTIFICATE OF CORRECTION

PATENT NO. : 11,695,178 B2
APPLICATION NO. : 16/613031
DATED : July 4, 2023
INVENTOR(S) : Michael A. Zimmerman et al.

Page 1 of 1

It is certified that error appears in the above-identified patent and that said Letters Patent is hereby corrected as shown below:

In the Specification

In Column 7, Line 52, should read:
"of collected side reaction products becomes constant, and"

In Column 8, Lines 43-46, should read:
"the trademark VECTRA®. These include VECTRA®A polyester (such as Vectra A950), VECTRA®C polyester, VECTRA®E polyester, VECTRA V (such as V400P), and VECTRA®B polyester-amide; and ZENITE, including"

In Column 9, Line 13, should read:
"with the desired thickness. In one embodiment, the resin is"

Signed and Sealed this
Thirty-first Day of December, 2024

Derrick Brent
*Acting Director of the United States Patent and Trademark Office*